United States Patent

[11] 3,625,748

| [72] | Inventors | Anton Aregger<br>Mutschellen;<br>Reinhard Rutz, Neuenhof (Aargau); Lutz<br>Zabel, Zurich, all of Switzerland |
|---|---|---|
| [21] | Appl. No. | 867,889 |
| [22] | Filed | Oct. 20, 1969 |
| [45] | Patented | Dec. 7, 1971 |
| [73] | Assignee | Kaspar Winkler & Co.<br>Zurich, Switzerland |
| [32] | Priority | Oct. 23, 1968 |
| [33] | | Switzerland |
| [31] | | 15859/68 |

[54] PROCESS FOR SEALING STRUCTURES
7 Claims, No Drawings

[52] U.S. Cl...................................................... 117/105.5,
117/161 UZ, 117/161 UB, 117/161 R, 117/168,
260/28.5 AS, 260/30.4 R, 260/41 A, 260/41 AG

[51] Int. Cl........................................................ B44d 1/08,
B44d 1/02

[50] Field of Search............................................ 117/102 S,
105.5, 168, 161 R, 161 OB, 161 UZ; 260/28.5 AS,
41 A, 41 AG, 30.4 R

[56] References Cited
UNITED STATES PATENTS

| 2,847,318 | 8/1958 | Dowlen et al................. | 117/104 X |
| 3,049,439 | 8/1962 | Coffman....................... | 117/105.5 |
| 3,338,848 | 8/1967 | Hamilton....................... | 117/104 X |

*Primary Examiner*—Alfred L. Leavitt
*Assistant Examiner*—Edward G. Whitby
*Attorney*—Warner W. Kleeman ABSTRACT: A process is disclosed for sealing leaks due to the existence of a liquid-permeable discontinuity or overall porosity in a structure such as a foundation or tunnel. The process disclosed involves the steps of initially introducing a polymer or mixtures thereof, preferably in powdered or granulated form, together with a filler and a liquid gelling agent, separately, into a device which is suitable for transporting, mixing and spraying the mixture when so admixed. Optional ingredients disclosed which are also useful include metallic oxides, for instance. The mixtures are applied to a structure and are particularly valuable for preventing the penetration of water through such structure.

PROCESS FOR SEALING STRUCTURES

BACKGROUND OF THE INVENTION

This invention relates to a process for the sealing or insulation of structures against leaks with the use of polymers. More particularly, this invention relates to a process for the sealing or insulation of structures, such as typically foundations and tunnels against the penetration of water by means of a polymer which is gellable at desired working temperatures.

According to procedures utilized in the past, various types of products were used to seal a structure, typically against water penetration. For example, a dual component resin or hot bitumen would be sprayed on a foundation or substratum and thereafter solidified thereat. It was also known to spray a bitumen emulsion and a rubber latex simultaneously with the addition of a coagulant. An anionic and cationic latex has also been used whereby a foil is formed during coagulation. These processes have not been considered satisfactory because they involved complex procedural steps and/or were uneconomical. In addition, the protective coating or layer produced in accordance with prior art processes was often chemically too unstable.

OBJECTS OF THE INVENTION

One of the primary object of this invention is the sealing of structures in order to prevent leaks resulting from the penetration of water through a liquid-permeable discontinuity.

Another object of this invention is the provision of a process for sealing of a structure and which prevents the penetration of water by a simple and economical process.

A still further object of this invention is a process for sealing leaks in structures with a protective coating which is chemically stable and possesses desirable mechanical characteristics, including tensile strength, deformability and elasticity. In this regard, another object of this invention is a process for sealing leaks in structures which involves the formation of a coating onto a structure in order to seal a leak, said coating exhibiting excellent water-resistant properties.

DETAILED DESCRIPTION OF THE INVENTION

Briefly, the process for sealing a structure, such as foundations and tunnels, comprises the steps of first introducing separately (1) a polymer or mixtures thereof, (2) a filler, and (3) a liquid gelling agent into a spray gun. Then the ingredients are mixed in the spray gun and thereafter the structure to be sealed is sprayed with the mixture, with the mixture gelling into a solid mass on the structure.

The gelling of the polymer with the gelling agent results in the formation of a solid body on the structure, such as a foundation, which is to be sealed. The mechanical characteristics of the solid body, including its tensile strength and elasticity properties, are largely determined by the type of mixture used.

Suitable polymers which can be employed in the process of this invention are those which are caused to gel as a result of the addition of a gelling agent, especially a plasticizer, at the desired working temperatures. The polymer is preferably in the form of a powder or granular form prior to its addition to a mixing and spraying device. Polymers and gelling agents which are employed in the practice of this invention should possess good water resistance. Particularly preferred for the practice of this invention are polyhydrocarbon compounds.

Gelling agents, especially plasticizers, which gel too slowly can be admixed with small amounts of volatile swelling agents for the polymer in order to accelerate gelling. These volatile swelling agents are thus incorporated into the solid product produced as a result of the gelling, or can also slowly evaporate.

It has also proven to be advantageous to spray simultaneously with the polymer-gelling agent-mixture reinforcing and, under some circumstances, a thickening filler, such as inorganic and organic fibers, sand, finely divided active silicates and the like. The addition of fillers improves the workability of the mixtures as well as the mechanical properties of the solidified masses, and the economy of the process.

When polymers are used which contain reactive groups, it is possible to cross-link the normally thermoplastic mixture and to render the mixture infusible. Polyacrylates with free carboxylic groups result in the formation of cross-linked structures, for example, when they are reacted with a metallic oxide such as zinc oxide. The metal oxide which is employed for this purpose can be conveyed simultaneously with the polymer powder because the cross-linking occurs only after interaction with the plasticizer or gelling agent.

Various types of equipment or devices can be utilized for the transporting, mixing and spraying of the mixtures of ingredients as discussed hereinbefore, and including those devices which are known and used in connection with the spraying of concrete or cement mortar. A particularly preferred device into which the polymer component and the liquid component can be fed separately is a dual component spray gun. According to this invention, the device must keep the polymer and the gelling agent separate until just prior to use in order to avoid any premature gelling of the polymer.

The following examples describe the process according to this invention, whereby the parts represent parts by weight.

ILLUSTRATIVE EXAMPLES

Example 1

Twenty-five parts of a powder, which consists essentially of polystyrene having an average particle diameter of $7\mu$ and is sold under the trademark EMUPULVER (commercially available from Badische Anilin- and Sodafabrik A. G., of Ludwigshafen, W. Germany) are mixed, at room 44 with 30 parts of powder or finely ground quartz (silica flour), 30 parts MOBILSOL 44 (an oil obtainable from the Mobil Oil Co., density 1.046, refractive index 1.605, flash point 160° C.), and 3 parts tetrahydro-furan in a dual component gun (Aliva concrete spraying machine by Spribag, 8968 Mutschellen, Switzerland). The powder component and liquid component are each fed separately into the apparatus and are only combined shortly before leaving the apparatus. Within two minutes the mass gels into a solid body with a tensile strength of 1.5 kg./cm.$^2$ and an elongation at rupture of 500 percent of the original length, measured at an elongation speed of 1600 percent/minute. with respect to the original length of the test sample (DIN standard instead of SI, i.e. Germany Industrial Standard).

EXAMPLE 2

Twenty-five parts of a copolymer of 585 parts styrene with 15 parts methacrylic acid whose average particle diameter is $70\mu$ are mixed with 30 parts chalk powder. This mixture is then mixed with MOBILSOL 44 in the spray gun, which is described in example 1. Within 2 to 3 minutes the mass gels into a solid body having a tensile strength of 0.3 kg./cm$^2$ and an elongation at rupture of 1400 percent, determined according to the method described in example 1.

Example 4

A mixture of 20 parts of the polystyrene powder, mentioned in example 1, with 5 parts of the copolymer, described in example 2, 30 parts chalk powder and 5 parts zinc oxide is combined in a spray gun with a mixture of 30 parts MOBILSOL 44 with 5 parts tetrahydrofuran. Within 3 minutes the material gels. The solid body possesses a tensional strength of 7.2 kg./cm.$^2$ and an elongation at rupture of 190 percent, defined according to the method set forth in example 1.

Example 4

Forty parts of a mixture consisting of 1 part of a powder, which consists essentially of polystyrene with some cross-linkable groups and which is sold under the trademark EMUPULVER, and 1 part zinc oxide are mixed at room temperature in the spray gun, which is described in example 1, with 100 parts of a tar mixture consisting of 84 parts liquid tar (maximum water content of 0.1 percent, specific weight 1.172, fractional distillation of 0 percent up to 170°, 15 percent between 170° and 270°, 20 percent between 270 and 300° percent, 65 percent residue with a softening point of 39.2°), 8 parts methylene chloride and 8 parts styrene are sprayed together onto the foundation to be covered. The mass gels within 2 to 3 minutes into a solid body and possessing a tensile strength of 1.9 kg./cm.² and an elongation at rupture of 500 percent of the original length, defined according to the method described in example 1.

Having set forth various illustrative and preferred embodiments of the invention it should be apparent that the objects set forth at the outset of the specification have been satisfied. Accordingly, the extreme limits within which the ratio of polymer to gelling agent can be varied reach from 9 parts by weight of polymer to 91 parts of gelling agent to 95 parts by weight of polymer to 5 parts by weight of gelling agent. "Working temperature" means all temperatures possibly occurring on a construction site above −5° C., e.g. temperatures between −5° and 60° C. The term "gelling agent" cannot be defined independently. A gelling agent is only a gelling agent when it acts as such on a polymer. Otherwise it is just a simple chemical, for example a tar or a paraffin or an ester. Basically, the spraying of a rapidly gelling mixture is claimed to be the main feature of the process. The process will be operable with polymers obtained by polycondensation to average molecular weights higher than 50,000.

What is claimed is:

1. A process for the water-sealing of a structure which comprises introducing a polymer or mixture thereof, a filler and a liquid gelling agent for gelling such polymer or mixture thereof at ambient working temperature, separately into a spray gun, mixing said ingredients in said spray gun, and thereafter spraying said mixture onto the part of a structure to be water-sealed, said mixture rapidly gelling at ambient working temperatures into a solid mass on said structure.

2. The process according to claim 1, which comprises the step of introducing powdered polystyrene and liquid tar into the spray gun.

3. The process according to claim 1 wherein said polymer is polystyrene which possesses reactive groups, said polystyrene being present in a mixture containing zinc oxide and liquid tar.

4. The process according to claim 1 which comprises the step of adding powdered polystyrene and a colorless oil into a spray gun.

5. The process according to claim 1, which comprises the addition of (1) powdered polyvinyl chloride and (2) liquid tar in admixture with styrene separately into said spray gun.

6. The process according to claim 1, wherein the polymer is a member selected from polystyrene, copolymers of styrene with monomers containing free carboxylic groups, polyvinyl chloride, and polyacrylates with free carboxylic groups.

7. The process according to claim 6, wherein the polymer is used in powdered or granular form.

* * * * *